United States Patent Office 2,835,264
Patented May 20, 1958

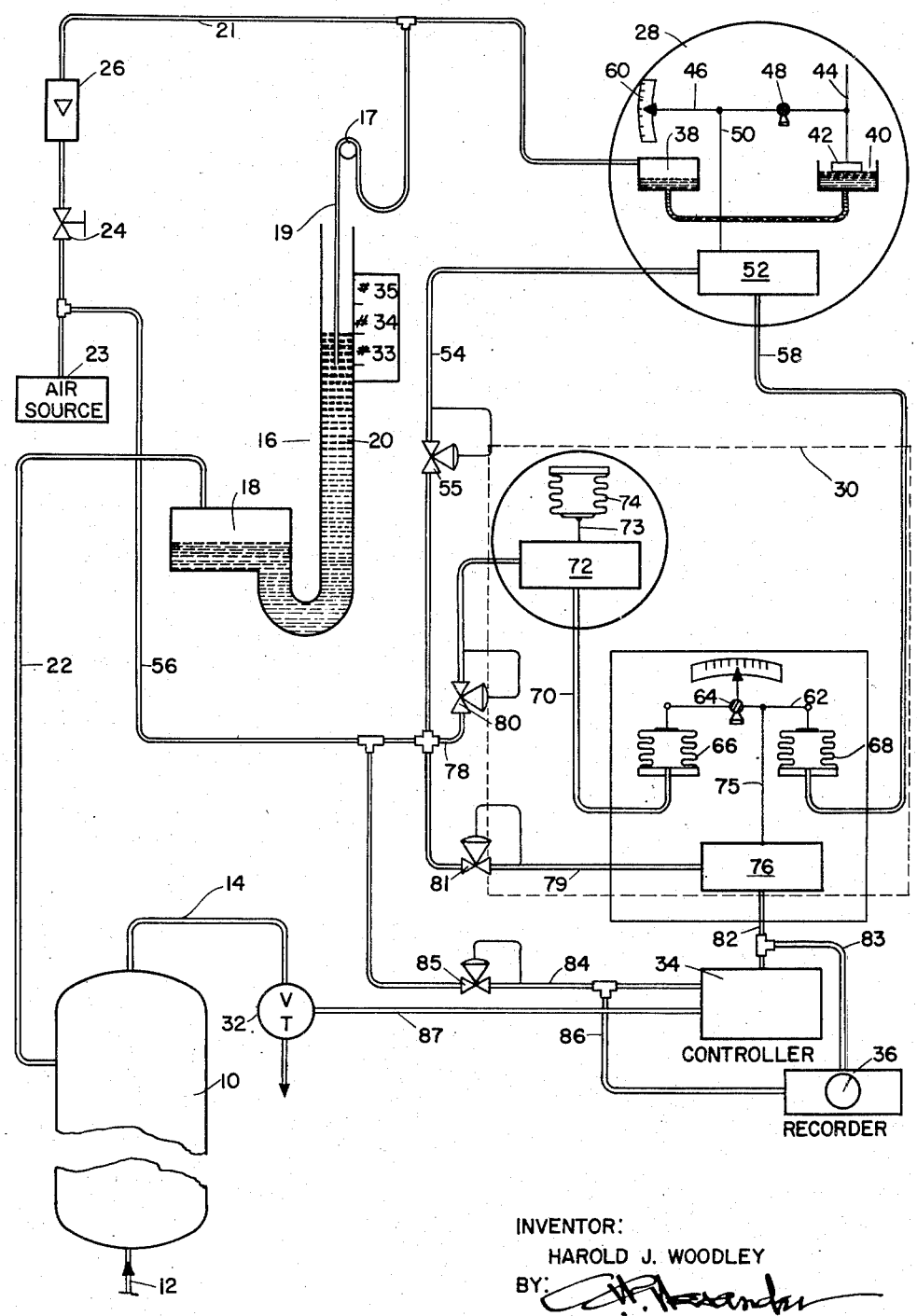

2,835,264

APPARATUS FOR MEASURING OR CONTROLLING A PHYSICAL QUANTITY

Harold J. Woodley, Whitby, Ellesmere Port, England, assignor to Shell Development Company, New York, N. Y., a corporation of Delaware Application October 22, 1956, Serial No. 617,341

Claims priority, application Great Britain November 1, 1955

8 Claims. (Cl. 137—81)

This invention relates to apparatus for measuring or controlling a physical quantity and pertains more particularly, to apparatus which converts variations in a physical quantity, such as pressure, temperature, flow rate and the like, into proportional fluid pressures which are utilized for measuring or controlling the physical quantity.

In the past, apparatus provided for controlling the values of such quantities has, in many instances, not operated with sufficient accuracy. This has been particularly apparent in the circumstance where the limits between which permissible variations of the value of the quantity can occur comprises a small range at a comparatively high value of the quantity such, for example, as small changes in a high pressure or temperature environment.

Accordingly, an object of this invention is to provide new and improved apparatus for determining changes in value over a small range of the value of a physical quantity and measuring the variations on a magnified scale of values covering the small range whereby the value of the quantity can be more accurately determined and controlled within the small range.

Another object of this invention is to provide apparatus as described above, wherein changes in value over a small range of the physical quantity are converted into fluid pressures varying over a magnified pressure scale proportional to the small range referred to, whereby the value of the quantity is controlled, measured or recorded in response to the fluid pressures.

Yet another object of this invention is to provide a new and improved apparatus for controlling a physical quantity such for example as the fluid pressure in a petroleum fractionating column.

Other objects and advantages of the present invention will become apparent from the following description taken in connection with the accompanying drawing wherein the single figure is a schematic illustration of the apparatus of the present invention.

Referring to the drawing, the apparatus of the present invention, is shown as arranged for measuring, recording and controlling the fluid pressure in a vessel 10 having a supply conduit 12 and a discharge conduit 14. Assuming, as a further illustration, that the apparatus of the present invention is described in connection with the production of iso-pentane, the vessel 10 subsequently may be referred to as a fractionating column, from the top of which iso-pentane vapor is removed after being separated from light gasoline and similar materials supplied to the bottom of the column. The apparatus of the present invention is employed for measuring, recording and controlling the fluid pressure in the top of the column. The operating pressure at the top of the column has a value such as about 49 p. s. i. a. and has preferably to be recorded and controlled to within ±0.05 p. s. i. to maintain purity of the iso-pentane. This pressure is in the neighborhood of 34 p. s. i. g. the actual p. s. i. g. varying with changes in atmospheric pressure. Thus it may be seen that the particular problem presented as an illustration embodies the accurate control of pressure over a small range (±0.05 p. s. i.) at a comparatively high value (49 p. s. i. a.) of pressure.

In accordance with the present invention accurate control is provided by apparatus comprising a zero pressure suppression device embodying a liquid manometer 16 having a low level side 18 open to the column and closed to atmospheric pressure, and a high level side 20 which is open to atmospheric pressure. While any suitable liquid may be used in the manometer, mercury is preferred. The low level side is connected to the column 10 by a conduit 22, whereby the mercury level in the high level side is proportional to the fluid pressure in the column. The high level side is sufficiently long to contain a mercury column corresponding to applied pressures up to 50 p. s. i. g., and the low level side has a capacity such that zero errors due to the movement of the surface of the mercury in the low level side are negligible over the whole of the manometer's operating range.

Associated with the manometer is a suitable liquid level follower-transmitter such, for example, as a continuous purge bubble-type liquid level transmitter including a suitable bubble tube 19, such, for example, as a flexible tube passing over a pulley 17 so that the lower or free end of the tube can be disposed at any selected level in the high level side 20. The upper end of the bubble tube is connected through an air line 21 to a continuous flow mechanism comprising a source of compressed air 23, a flow controller 24 and a rotometer 26. The diameters of the bubble tube 19 and the line 21 are large enough to permit free flow of air from the air supply through the free end of the tube when it is disposed above the mercury level in the high level side 20 whereby, in this condition, the pressure in the line 21 is at atmospheric pressure. However, it may be seen that as soon as the free end is immersed in mercury, the air pressure in the line 21 will rise, since the air must bubble out through the mercury, the increase in air pressure being proportional to the depth of immersion of the tube 19. Thus by properly adjusting the position of the free end of the tube 19 in the high level side 20, the liquid level transmitter can be made to operate over any selected part of a pressure range of from 0 to 50 p. s. i. g. in the column. For example, under the operating conditions previously set forth, wherein it is necessary to maintain the pressure in the top of the column at 49 p. s. i. a. ±.05 p. s. i. (or about 34 p. s. i. g.), the free end of the tube 19 is preferably adjusted so that it is just immersed by the mercury in the high level side when the pressure in the column 10 is 48 p. s. i. a. (or about 33 p. s. i. g.), the high level side being calibrated, for example, over a span of 2 p. s i. g. or from 33 to 35 p. s. i. g. as shown in Figure 1. Thus, as the mercury level in the high level rises from the 33 p. s. i. g. level to the 35 p. s. i. g. level, the air pressure in the line 21 increases from 0 to 2 p. s. i. g.

Further, the apparatus comprises a differential pressure transmitter 28 which is connected to the air line 21 for transmitting a pneumatic output signal proportional over a selected magnified pressure scale to the pressure in the air line 21, an atmospheric pressure compensator 30 connected to the output of the transmitter for correcting the pneumatic signal for variations in atmospheric pressure from a predetermined value, a pneumatically operated valve 32 in the discharge line 14, a controller 34 pneumatically connected to the valve 32 and the compensator 30 for regulating the valve and controlling the fluid pressure in the column 10 in response to the value of the corrected signal, and a recorder 36 pneumatically connected to the compensator 30 for recording the pressure in the column 10 in response to the value of the corrected signal and over the same magnified pressure scale.

The elements 28, 30, 32, 34 and 36 may be of any suitable type. As shown in Figure 1, the differential pressure transmitter 28 comprises a secondary liquid manometer, preferably a mercury manometer having a low level side 38 closed to atmospheric pressure and a high level side 40 which is open to atmospheric pressure. Disposed in the high level side 40 is a float type level-follower 42 carrying a stem 44 which is pivotally connected to a pointer arm 46 which pivots about an axis 48. The arm 46 is provided with a fixed link member 50 which operates an air relay or transmitter 52. This transmitter, as well as those subsequently described, may be of any suitable type such, for example as an adaptation of the M–42 Pneumatic Transmitter described in Foxboro Bulletin 415 published February, 1950.

The transmitter 52 is supplied with operating air from the source 23 by a branch air line 54 which is connected through a back pressure regulator 55 to a main air line 56. The transmitter 52 determines the air pressure in a line 58 which is connected to the atmospheric pressure compensator 30. In response to the movement of the link 50, the transmitter transmits a signal varying over a magnified pressure scale ranging, for example from 3 to 15 p. s. i., a six times magnification of the 0 to 2 p. s. i. range for which the high side of the manometer 16 has been calibrated. More particularly, it may be seen that when the mercury level in the high level side 20 is below the 33 p. s. i. g. level, the high and low level sides 38 and 40 of the secondary manometer are both at atmospheric pressure and the mercury in each side is at the same level. Under these conditions the transmitter 52 maintains the pressure in the air line 58 at a "live zero" of 3 p. s. i. As the pressure in the column 10 rises and the free end of the tube 19 becomes immersed, the air pressure in the low level side 38 of transmitter 28 increases proportionally, the float 42 rises with the mercury in the high level side 40 and the pressure in the line 58 is proportionally increased over the magnified pressure scale. Preferably, the pointer 46 is provided with a pressure scale 60 to provide a direct indication of the pressure (p. s. i. g.) in the column 10. The magnitude of the full scale deflection on this scale corresponding to variations in column pressure within the range 2 p. s. i. g. will determine the accuracy with which variations within this range can be detected. If an indication is required in terms of absolute pressure, the arrangement can readily be provided with means to compensate for variations in atmospheric pressure.

The atmospheric pressure compensator 30 comprises a mechanism for algebraically combining the signal from the transmitter 52 with a pressure signal varying on the same scale in dependence upon any variations of atmospheric pressure from a predetermined value. This is required since the column pressure is measured by the manometer 16 as a gauge pressure, and if the absolute column pressure remained constant, and the atmospheric pressure varied, there would be an alteration in the pressure recorded by the manometer 16. Thus, it is necessary, since the absolute value of the column pressure is to be kept constant, to compensate for variations in atmospheric pressure. To this end the compensator includes a balance mechanism comprising a beam 62 pivoted about an axis 64, and subject on either side of the axis to an upward thrust exerted by expansible bellows 66 and 68. The interior of the bellows 68 is connected to the air line 58 and the interior of the other bellows 66 is connected to an air line 70 carrying an air pressure signal varying in the range 3 to 15 p. s. i. and derived by a transmitter 72 in dependence upon a variation in atmospheric pressure from a predetermined value as sensed by a bellows 74 which is mechanically connected by link 73 for operating the transmitter 72. The beam 62 is mechanically connected by link 75 for operating a transmitter 76 which, in response to movement of the beam, transmits an air pressure signal varying in the range 3 to 15 p. s. i. and representing the output signal of the transmitter 52 corrected for any variations due to a change in atmospheric pressure. As shown in Figure 1, operating pressure is supplied to the transmitters 72 and 76 through branch lines 78 and 79 and back pressure regulators 80 and 81. While some form of compensator is desirable in this apparatus, since the column pressure must be controlled to 49 p. s. i. a., it will be appreciated that it may be omitted in other apparatus where it is only the guage value of the pressure that has to be controlled.

The controller 34 is connected to the output of the transmitter 76 by an air line 82, which also communicates with an air line 83 leading to the recorder 36. Operating pressure is supplied to the controller by a branch line 84 including a back pressure valve 85. An operating air line 86 communicates between the line 84 and the recorder 36. Any suitable type of recorder and controller may be employed such, for example, as a Model 53 Foxboro Recorder and a Model 58 Foxboro Controller, described in Foxboro Bulletin 463, published March, 1952. The controller 34 is connected by an air line 87 to any conventional type air operated throttling valve 32 which, in response to a pneumatic signal from the controller varied by the corrected pneumatic signal from the transmitter 76, operates to control the flow of iso-pentane vapor from the column 10 and thus maintain the pressure in the top of the column at the predetermined valve of 49 p. s. i. a.

With the apparatus of the present invention it is possible to accurately control and record the pressure in the column 10. It may be seen that if a single manometer were used, the pressure being recorded and controlled on a scale from 0–50 p. s. i. g., the smallest variation that could be significantly detected would be of the order of 1½% of the pressure corresponding to full scale deflection, i. e. 0.975 p. s. i., whereas with the arrangement described variations in the column pressure as small as 0.036 p. s. i. a., can easily be detected, giving a percentage accuracy of better than 0.1%.

The foregoing description has been given for clearness only, and no unnecessary limitation should be implied therein or inferred therefrom, for it will be apparent to those skilled in the art that variations and changes may be made in the present apparatus without departing from the spirit and scope of the appended claims. For example, the apparatus of the present invention can be employed for measuring, recording, or controlling other physical quantities such as temperature or fluid flow rate. This can be done by converting a particular quantity into a representative pressure which is applied to the low level side of the manometer 16. For example, in the case of temperature control, the temperature variations can be converted into corresponding pressure variations by a suitable thermometric device, the pressure variations being applied to the manometer 16 as noted above, and the pneumatic signal from the transmitter 52 (corrected by the compensator 30 if necessary) being applied to a recorder and controller for operating a suitable temperature regulating device.

Also it is understood that the apparatus of the present invention may be operated on any suitable gas pressure medium, the terms "air" and "pneumatic" as employed hereinabove and in the appended claims including within their scope the use of such other pressure mediums as may be employed.

I claim as my invention:

1. Apparatus for controlling the fluid pressure in a vessel having a fluid supply conduit and a fluid discharge conduit, said apparatus comprising a liquid manometer having a low level side closed to atmospheric pressure and a high level side open to atmospheric pressure, a fluid pressure conduit connected between the vessel and the low level side whereby the liquid level in the high level continuous purge bubble-type liquid level transmitter in communication with the liquid level in the high level side of the manometer, said transmitter being adapted to generate and transmit a pneumatic signal proportional over a magnified pressure scale to variations in the fluid pressure in the vessel, and a pneumatically operated valve in one of said conduits for controlling the flow through said conduit, said valve being pneumatically connected to said transmitter for controlling the fluid pressure in the vessel in response to the value of the pneumatic signal from said transmitter.

2. The apparatus of claim 1 and including an atmospheric pressure compensator connected to the output of said transmitter for correcting the pneumatic signal for variations in atmospheric pressure, a controller pneumatically connected to the valve and said compensator for regulating the valve and controlling the fluid pressure in the vessel in response to the value of the corrected signal, and a recorder pneumatically connected to said compensator for recording over the magnified pressure scale the pressure in the vessel in response to the value of the corrected signal.

3. Apparatus for measuring over a small pressure range the pressure variations of a relatively high pressure fluid, said apparatus comprising a liquid manometer having a low level side closed to atmospheric pressure and a high level side open to atmospheric pressure, conduit means establishing communication between the pressure fluid and the low level side whereby the liquid level in the high level side is proportional to the fluid pressure, a continuous purge bubble-type liquid level transmitter means connected to follow the liquid level in the high level side and adapted to generate and transmit a pneumatic signal proportional over a magnified pressure scale to variations in the fluid pressure occurring over the small pressure range, and a recorder pneumatically connected to the liquid level follower-transmitter for recording the value of the fluid pressure on a magnified pressure scale corresponding to variations in fluid pressure over the small pressure range.

4. Apparatus for maintaining at a predetermined value the fluid pressure in a fractionating column having a fluid discharge conduit, said apparatus comprising a mercury manometer having a low level side closed to atmospheric pressure and a high level side open to atmospheric pressure, a fluid pressure conduit connected between the column and the low level side whereby the mercury level in the high level side is proportional to the fluid pressure in the column, an air line, a source of compressed air connected to said line, an adjustable bubble tube connected to the air line and having a free end disposed in the high level side of the manometer and adapted to be immersed in the mercury therein whereby the air pressure in the line is varied in proportion to the depth of immersion of the tube, said free end being disposed below the level assumed by the mercury in the high level side when the fluid pressure in the column is at the predetermined value, a differential pressure transmitter connected to the air line for transmitting a pneumatic output signal proportional over a magnified pressure scale to the pressure in the air line, an atmospheric pressure compensator connected to the output of said transmitter for correcting the pneumatic signal for variations in atmospheric pressure from a predetermined value, a pneumatically operated valve in said discharge line, a controller pneumatically connected to said valve and said compensator for regulating the valve and controlling the fluid pressure in the vessel in response to the value of the corrected signal, and a recorder pneumatically connected to said compensator for recording the pressure in the column in response to the value of the corrected signal.

5. The apparatus of claim 4 wherein the differential pressure transmitter comprises a secondary mercury manometer having a low level side normally closed to atmospheric pressure and a high level side open to atmospheric pressure, said low level side being connected to the compressed air line whereby the mercury level in the high level side is proportional to the air pressure in the line, a liquid level follower in the high level side, an air relay, a source of operating air for said relay and means mechanically connected to the liquid level follower for operating the relay for sending a pneumatic output signal proportional over a magnified pressure scale to the pressure in the air line.

6. Apparatus for measuring, over a small pressure range, pressure variations of a relatively high pressure fluid, said apparatus comprising a liquid manometer having a low level side closed to atmospheric pressure and a high level side open to atmospheric pressure, conduit means establishing communication between the pressure fluid to be measured and the low level side whereby the liquid level in the high level side is proportional to the fluid pressure, an air line, a source of compressed air in communication with said line, an adjustable bubble tube connected to the air line and having a free end disposed in the high level side of the manometer and adapted to be immersed in the fluid therein whereby the air pressure in the line is varied in proportion to the depth of immersion of the bubble tube, said free end being disposed substantially at a level assumed by the liquid in the high level side when the fluid pressure is of a value equal to the lower limit of the small range being measured, and a differential pressure transmitter connected to said air line for transmitting a pneumatic output signal proportional, over a magnified pressure scale, to the pressure in the air line.

7. The apparatus of claim 6, wherein a recorder is pneumatically connected to the differential pressure transmitter for recording the value of the fluid pressure, on a magnified pressure scale corresponding to variations in fluid pressure over the small pressure range.

8. The apparatus of claim 7 wherein the bubble tube has a diameter such that the pressure in the air line is at atmospheric pressure when the liquid level in said high side is below the free end of the bubble tube, and said apparatus including an atmospheric pressure compensator pneumatically connected to the differential pressure transmitter and the recorder for correcting the pneumatic signal applied to the recorder for variations in atmospheric pressure.

No references cited.